(12) United States Patent
Welker et al.

(10) Patent No.: US 9,080,924 B2
(45) Date of Patent: Jul. 14, 2015

(54) ON BOARD SEAT LEAKAGE DETECTION SYSTEM

(75) Inventors: Patrick Welker, Muncie, IN (US);
Brian Zabel, Yorktown, IN (US);
Gregory Todd Filkovski, Muncie, IN (US)

(73) Assignee: Honeywell International Inc., Morristown, NJ (US)

( * ) Notice: Subject to any disclaimer, the term of this patent is extended or adjusted under 35 U.S.C. 154(b) by 676 days.

(21) Appl. No.: 13/349,031

(22) Filed: Jan. 12, 2012

(65) Prior Publication Data

US 2013/0180317 A1 Jul. 18, 2013

(51) Int. Cl.
*G01M 3/28* (2006.01)

(52) U.S. Cl.
CPC .................................. *G01M 3/2876* (2013.01)

(58) Field of Classification Search
CPC .............................. G01M 3/28; G01M 3/2876
USPC .................................................. 73/40.5 R, 46
See application file for complete search history.

(56) References Cited

U.S. PATENT DOCUMENTS

| 2,430,122 | A | * | 11/1947 | Grace, Jr. ..................... 137/551 |
| 4,043,355 | A | * | 8/1977 | Cerruti et al. ................. 137/312 |
| 4,825,198 | A | * | 4/1989 | Rolker et al. ................. 340/605 |
| 5,801,298 | A | * | 9/1998 | Anderson ..................... 73/49.8 |
| 6,167,749 | B1 | * | 1/2001 | Yanagisawa et al. ...... 73/40.5 R |
| 7,283,913 | B2 | * | 10/2007 | Garnaes ........................ 702/51 |
| 2011/0100096 | A1 | * | 5/2011 | Szepek et al. ............. 73/40.5 R |

FOREIGN PATENT DOCUMENTS

EP 184836 * 12/1985

* cited by examiner

*Primary Examiner* — Daniel S Larkin
(74) *Attorney, Agent, or Firm* — Brooks, Cameron & Huebsch, PLLC

(57) ABSTRACT

Equipment and methodology are provided for performing seat leakage detection on a valve assembly including at least two valves to be tested, wherein, while both of the valve assembly valves remain closed, at least a first shut off valve of a plurality of shut off valves is closed to enable flow of fluid through manifold passages of a plurality of manifold passages to test the first valve of the valve assembly valves and, subsequently, at least another shut off valve of the plurality of shut off valves is closed to enable flow of fluid through manifold passage of the plurality of manifold passages to test the second valve of the valve assembly valves.

24 Claims, 5 Drawing Sheets

ON BOARD SEAT LEAKAGE DETECTION SYSTEM

FIELD OF THE INVENTION

Disclosed embodiments are directed, generally, to valve seat leakage testing of a shut-off valve apparatus and particularly to valve seat leakage testing to test operation of an Emergency Safety Device (ESD) such as a rapid-closing shut-off valve apparatus.

DESCRIPTION OF THE RELATED ART

Various organizations and manufacturers recommend users of safety shut-off valve assemblies to check the seat leakage of the safety shut-off valves at regular intervals. However, it is unclear whether users are performing safety shut-valve checks on a periodic basis to ensure proper operation. Although valve manufacturers may provide a recommended procedure for performing the check, conventional methodologies can be both labor intensive and time consuming. This may be one reason for conventional failures to conduct such checking on a periodic basis.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

According to the present disclosure, valve seat leakage detection methodologies and equipment are provided wherein the constituent valves of one or more electromechanical valve assemblies to be tested are closed and subjected to changes in flow on one side (e.g., an upstream side) to determine whether corresponding changes in flow are detected by one or more sensors provided on another side, (e.g., downstream side of the valve(s)).

Accordingly the disclosed embodiments, the seat leakage detection may be performed using one or more flow sensors.

According to disclosed embodiments, the equipment used to perform seat leakage detection may be at least partially implemented using an on-board module configured to control testing and report pass/fail testing results that may be implemented using an on-board microprocessor configured to control the testing and generate leakage information and seat leakage and health report information for the tested valve(s) or valve assembly(ies).

According to disclosed embodiments, the seat leakage detection methodology may be initiated locally, e.g., on the valve assembly or on a control panel near valve assembly or remotely, e.g., from a Burner Management System.

Additional features of the disclosure will become apparent to those skilled in the art upon consideration of the following detailed description of illustrated embodiments exemplifying the best mode of carrying out the disclosure as presently perceived.

BRIEF DESCRIPTION OF THE DRAWINGS

A more compete understanding of the present invention and the utility thereof may be acquired by referring to the following description in consideration of the accompanying drawings, in which like reference numbers indicate like features, and wherein.

DETAILED DESCRIPTION

The description of specific embodiments is not intended to be limiting of the present invention. To the contrary, those skilled in the art should appreciate that there are numerous variations and equivalents that may be employed without departing from the scope of the present invention. Those equivalents and variations are intended to be encompassed by the present invention.

In the following description of various invention embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope and spirit of the present invention.

Moreover, it should be understood that various connections are set forth between elements in the following description; however, these connections in general, and, unless otherwise specified, may be either direct or indirect, either permanent or transitory, and either dedicated or shared, and that this specification is not intended to be limiting in this respect.

Safety shut-off valves are released when system safety interlocks require shut down, for example, when the pressure or temperature exceeds preset limits. Due to redundancy requirements, safety, shut-off valves are usually provided in pairs in safety, shut-off valve assembles.

Figure 1:
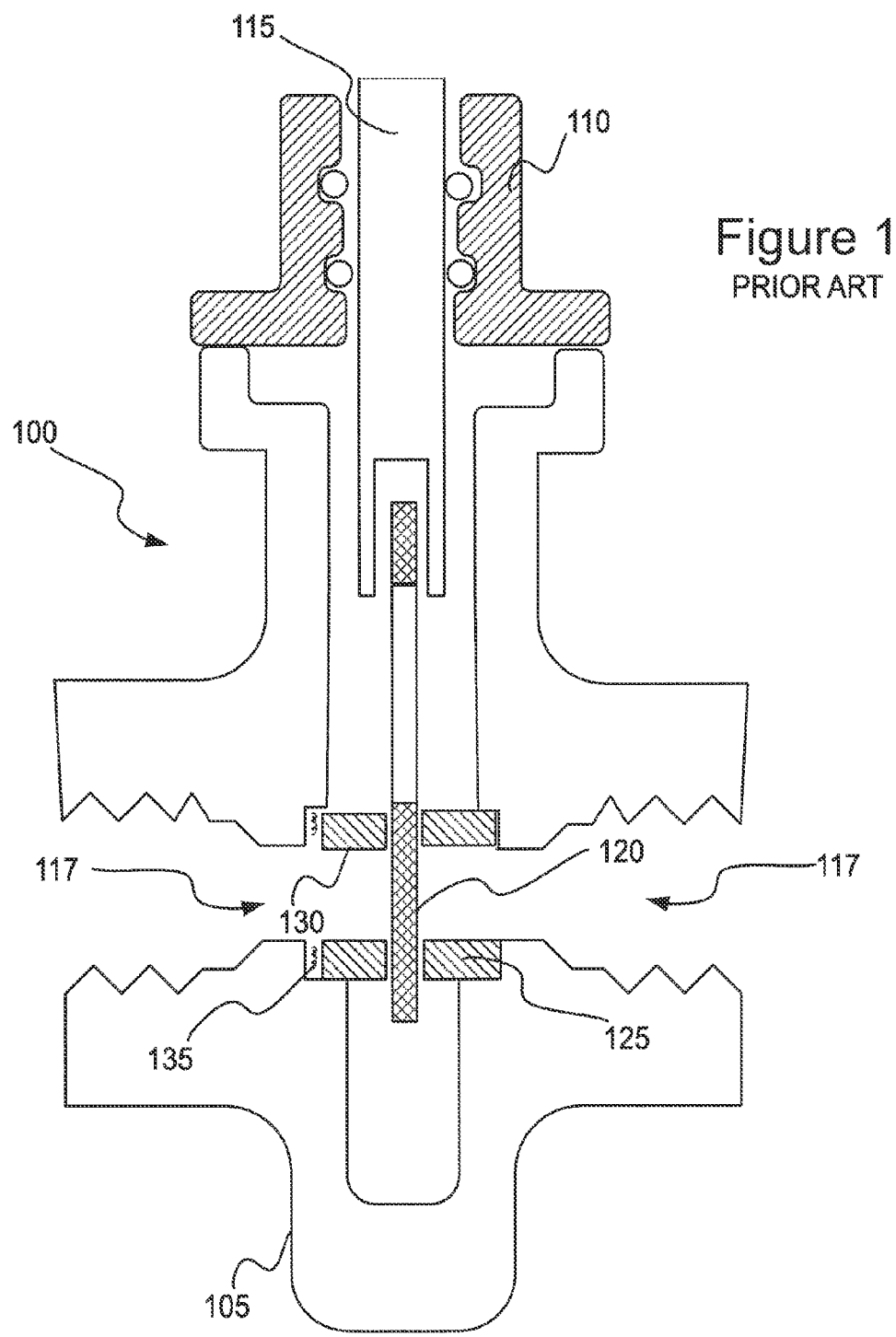
FIG. 1 illustrates a conventional gate valve and its constituent parts and is an illustrative aid useful in describing the concept of valve seat leakage.

As illustrated in FIG. 1, a conventional gate valve includes a body 105, bonnet 110, and stem 115. The valve's body 105 is the outer casing of most or all of the valve 100; thus, the body 105 is a housing that contains the internal parts for the valve 100. The valve body 105 is affixed to the bonnet 110, which acts as a cover on the valve body 105. The bonnet 110 may be semi-permanently screwed into the valve body 105 or bolted onto it. Ports 117 are passages that allow fluid to pass through the valve 100. Accordingly, ports 117 are obstructed by the valve member (also known as a disc or sealing gate) 120 to control flow. The valve member 120 is a movable obstruction inside the stationary body 105 that adjustably restricts flow through the valve 100. When utilized in an SSOV, the valve member 120 may be controlled by a handle (not shown) or actuator (not shown).

The seat 125 (also known as the sealing ring) is the interior component of the valve body 105 that contacts the valve member 120 to form a leak-tight seal.

The wave spring 135 is a flat metal ring bent in a manner that applies a spring force on the follow ring 130. The follow ring is a bearing force that transfers that applied force to the gate to ensure that the valve member 120 stays in contact with the seat. The applied spring force also provides some sealing in the opposite direction to normal flow/pressure.

The National Fire Protection Association (NFPA) recommends that users of safety shut-off valves check the seat leakage of their valves at regular intervals per the valve manufacturers recommendations, e.g., annually. Although valve manufacturers may provide a recommended procedure for performing the check, conventional methodologies can be both labor intensive and time consuming. As a result, it is unclear whether safety shut-off valves are being checked on a periodic basis to ensure proper operation.

Accordingly, disclosed embodiments provide on board seat leakage checking components and methodologies that more effectively, efficiently and easily perform a seat leakage check.

Disclosed embodiments provide a device that is configured to be affixed, e.g., bolted, to the side of a valve body. Thus, the monitoring device may be affixed to the valve body, such as valve body 105 illustrated in FIG. 1 and may include a housing that includes all of the required hardware to perform a leakage test. Accordingly, the testing device may include a plurality of manifolded passages configured to direct flow thru a desired path to detect leakage. These manifolded passages may have various alternative configurations depending on the theory for detecting actual leakage that is employed.

Accordingly, actual leakage can be detected by various disclosed embodiments by sensing flow using one or more flow sensors.

Figure 2:
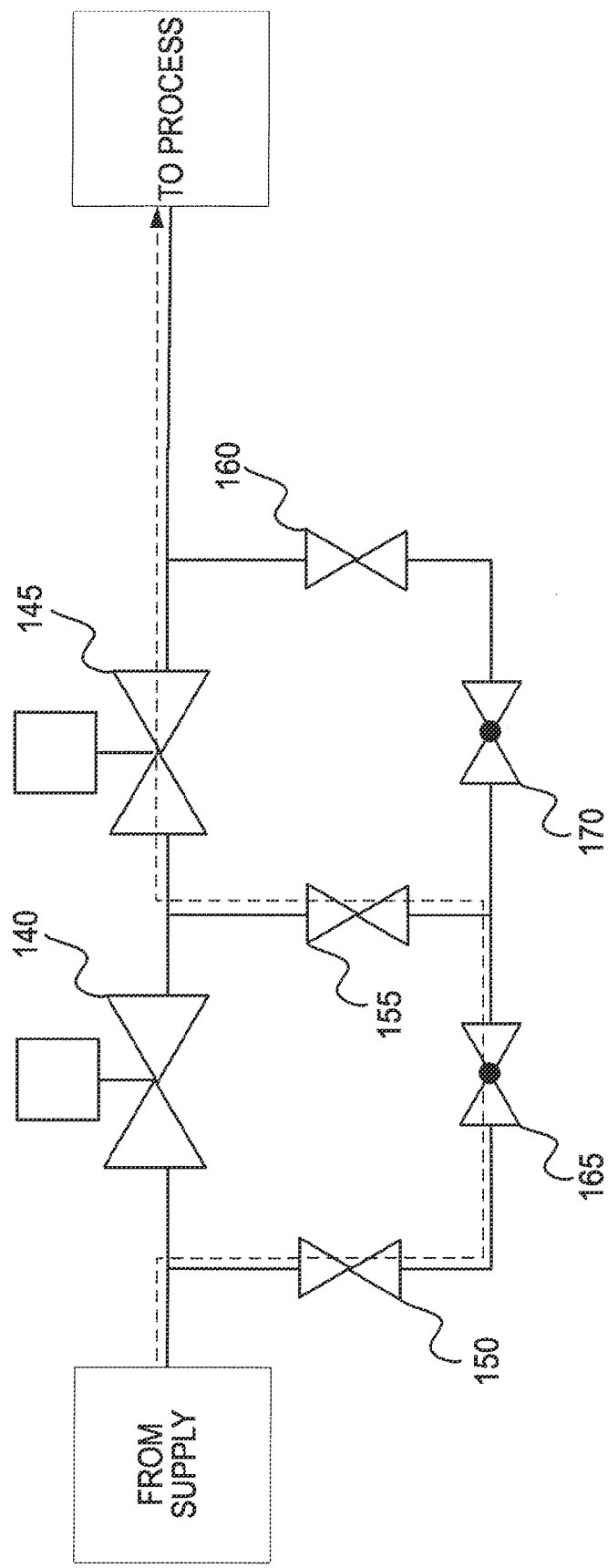
FIGS. 2 and 3 illustrate an embodiment of the seat leakage detection equipment components wherein leakage is detected using flow sensors that do not require a flow limiting orifice.
Figure 3:
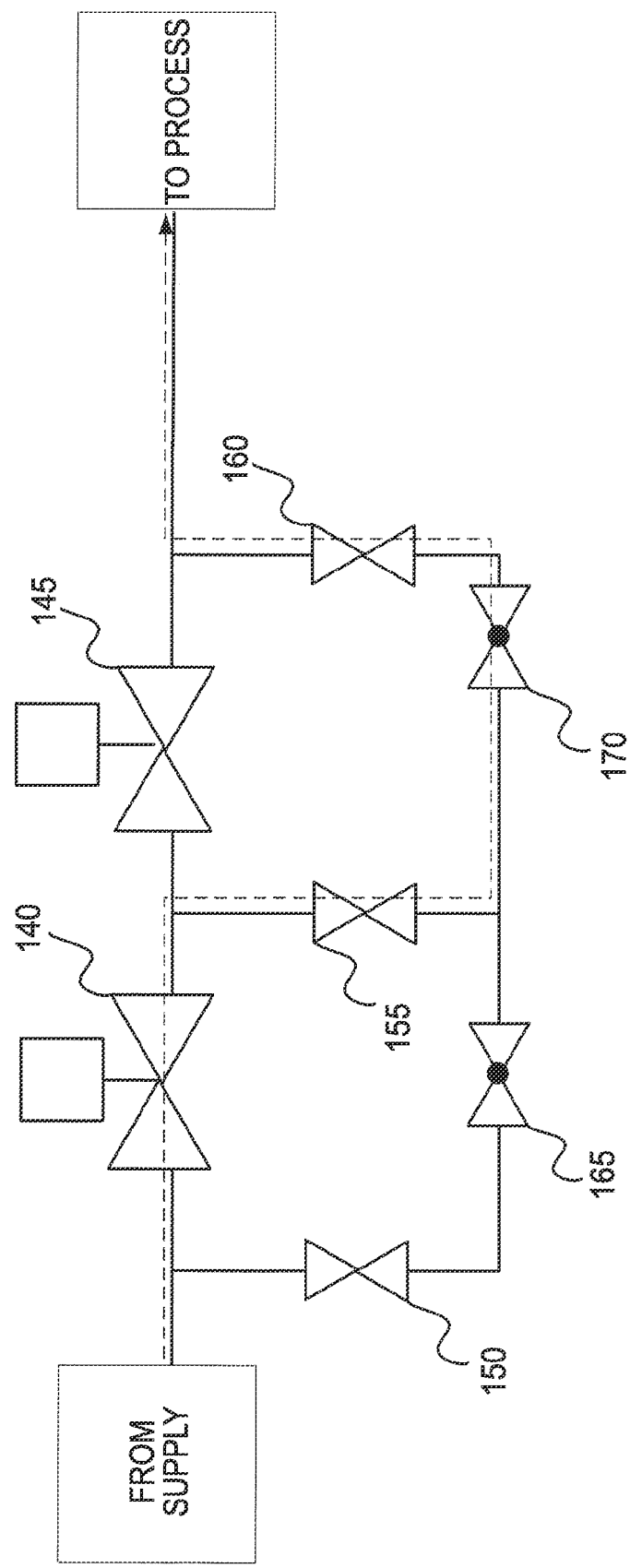

FIGS. 2 and 3 illustrate an embodiment of the detection equipment components wherein leakage is detected using two flow sensors. As shown in FIG. 2, two Safety Shut Off Valves (SSOVs) 140, 145 are provided in an assembly configuration between a supply side (or upstream side) and a process side (or downstream side). The hardware for detecting seat leakage for these SSOVs 140, 145 is encompassed in components 150-170 and associated control mechanisms (not illustrated). More specifically, two flow sensors 165, 170 are provided and configured to sense fluid flow along the paths in which they are respectively provided. Additionally, a plurality of auxiliary shut off valves 150, 155, 160 (also referred to as solenoid valves) are provided in relation to the flow sensors 165, 170 to alter the path for potential flow from the supply side to the process side of a process setup including the SSOVs. Additionally, the valves 150, 155, 160 can be used to isolate the flow sensors 165, 170 from normal operation of the valve(s) by closing the valves 150, 155, 160 when testing is not in progress.

Accordingly, as shown in FIG. 2, the hardware configuration may be provided to test or detect seat leakage in the SSOV 145. This is done by opening the auxiliary valves 150 and 155 to enable flow of fluid through the passage way encompassing those elements and the flow sensor 165. In tandem, both the SSOVs 140, 145 are closed. Once the lines coupling the valves have been primed, i.e., the fluid has built up within the lines and flow has stopped as a result of the valves being closed, the flow sensor 165 can register whether there is any seat leakage in the SSOV 145. This is because the only way that the flow sensor 165 would register any flow after priming would be if there were leakage at the SSOV 145 that would enable that flow. As a result, no fluid should flow from the supply side to the process side unless there is seat leakage in the SSOV 145.

The hardware configuration may similarly be altered to test or detect seat leakage in the SSOV 140. More specifically, as shown in FIG. 3, the auxiliary valve 150 is closed and the auxiliary valves 155 and 160 are opened. However, both the SSOVs 140, 145 are closed. As a result, the flow sensor 170 would sense or register any flow along the path encompassing the auxiliary valves 155, 160 and the flow sensor 170. If there were seat leakage in the SSOV 140, the valve would register or sense the flow of fluid to the process side even if the SSOV 140 was closed. If there was not seat leakage in the SSOV 140, the flow sensor 170 would not detect flow.

Figure 4:
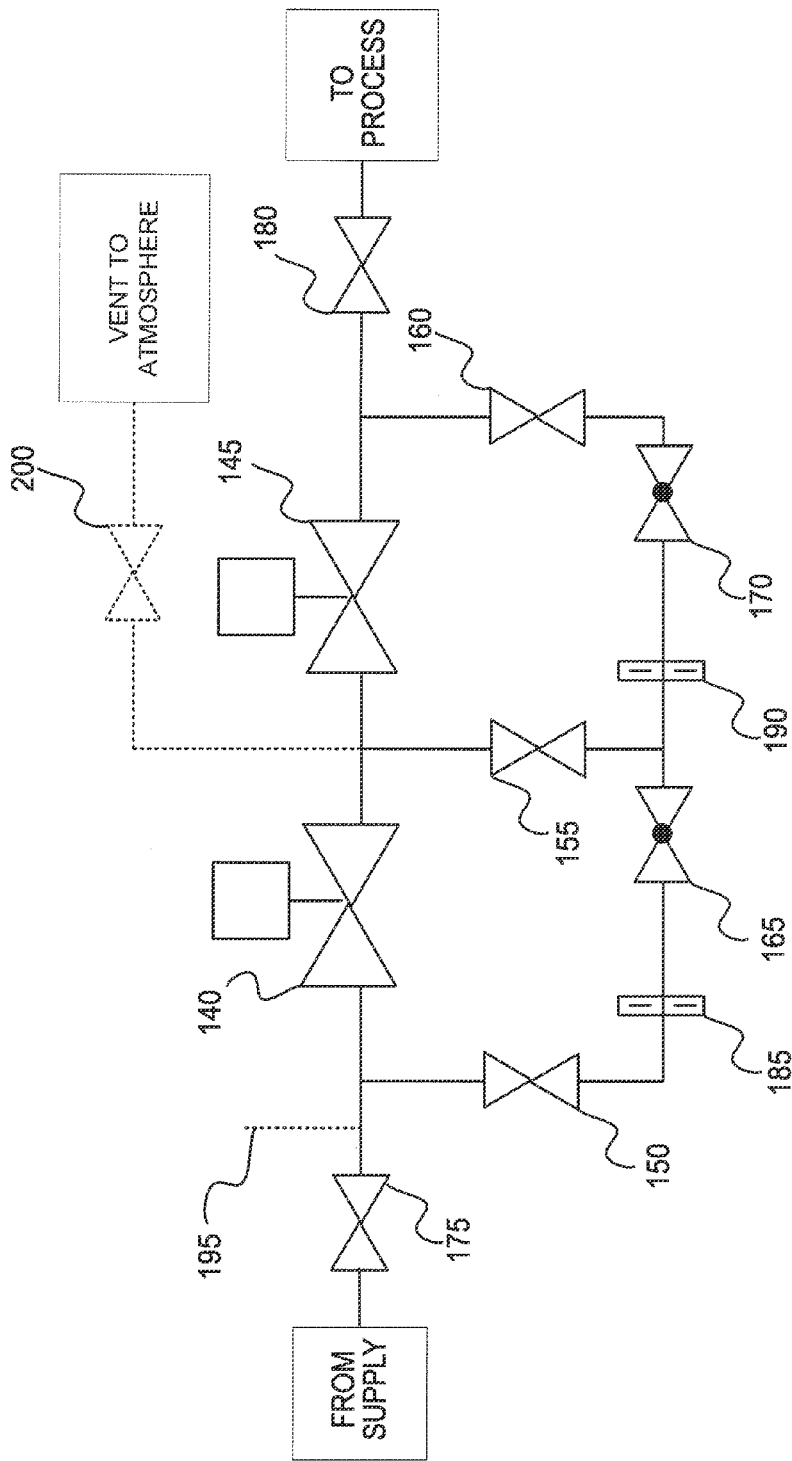
FIG. 4 illustrates additional optional details of the embodiment of the seat leakage detection equipment components wherein leakage is detected using flow sensors that require a flow limiting orifice.

FIG. 4 illustrates additional optional details of the embodiment of the device wherein leakage is detected using the flow sensors. Thus, there are two SSOVs 140, 145 provided in a configuration between a supply side and a process side. The hardware for detecting seat leakage for these SSOVs 140, 145 is encompassed in components 150-180 and associated control mechanisms (not illustrated).

However, in addition, the components also include manual isolation valves 175 and 180 provided on the supply side and process side of the configuration, respectively. Additionally, limiting orifices 185 and 190 may be optionally provided to reduce the flow of fluid prior to the location of the flow sensors 165, 170, respectively; this is particularly important if the flow sensors have a limited capacity. Optionally, the configuration may also include a port 195 to customer supplied air. This port may be used if the total flow provided from the supply side is not sufficient to adequately perform the seat leakage detection test methodology or the customer/user of the valve elects not to use the supplied fluid as part of the test (e.g., the fluid is expensive, dangerous, etc.) Likewise, an optional vent 200 to atmosphere may be provided. To the extent that the vent 200 is included in any of the disclosed embodiments, it should be understood that the leak detection component configuration may be configured to be able to power the vent valve 200 to a closed position in order to properly perform the seat leakage detection methodology. This is because power to that vent 200 may be provided by a main BMS control system that may be isolated from the vent 200 when the seat leakage detection testing process is active.

Figure 5:
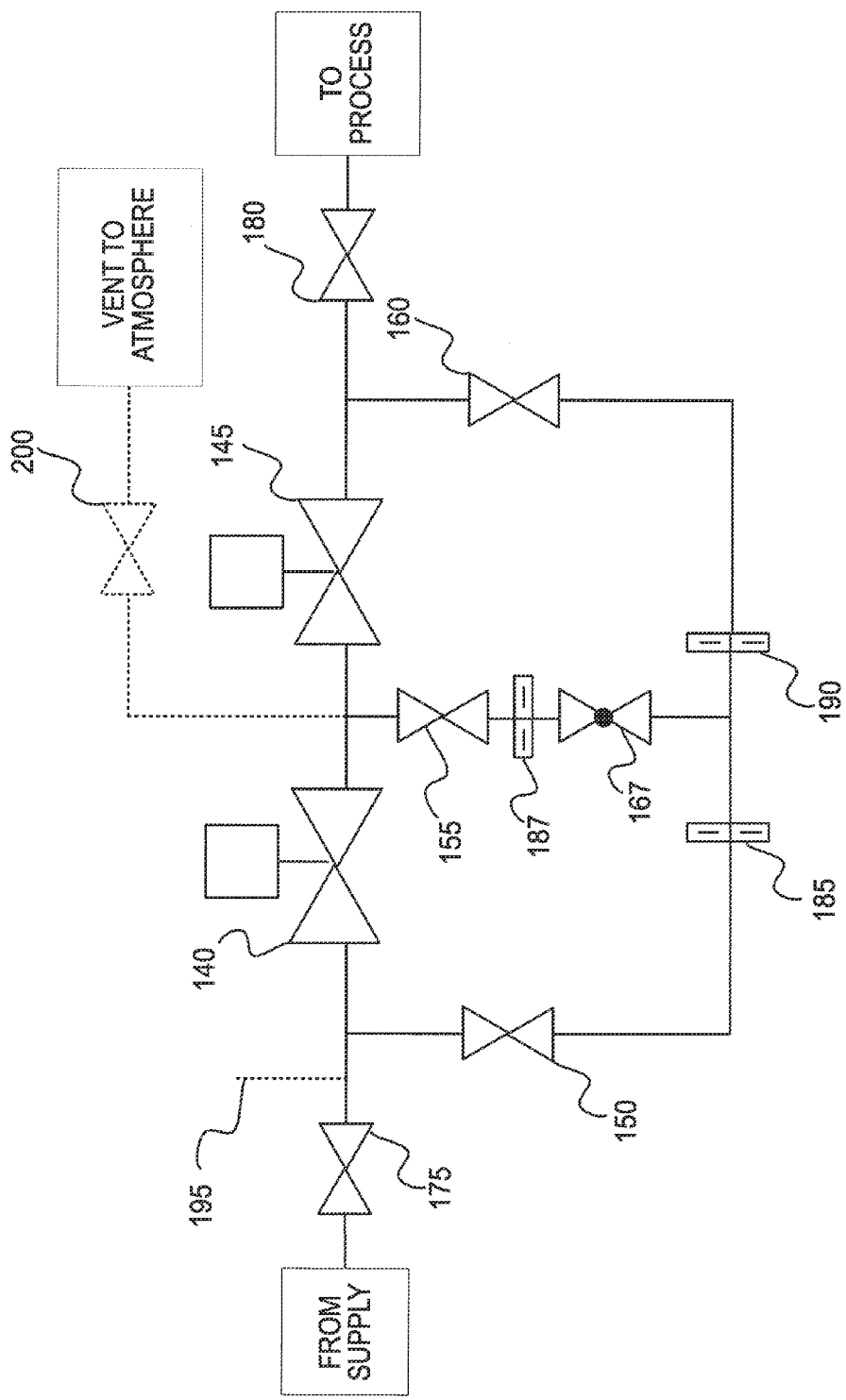
FIG. 5 illustrates an additional embodiment of the set leakage detection equipment components wherein leakage is detected using a single bi-directional flow sensor.

The components illustrated in FIG. 4 may be included in any of the embodiment configurations illustrated in FIGS. 2-3 and 5 as well. Therefore, it should be understood that option ports to supplied air or vents to atmosphere and isolation valves and orifices may have utility given a particular implementation.

FIG. 5 illustrates an additional embodiment of the seat leakage detection equipment components wherein leakage is detected using a single bi-directional flow sensor. The reduction in the number of necessary flow sensors provides a benefit of a decreased cost associated with the seat leakage detection components. However, by only including a single flow sensor, the bi-directional flow sensor's accuracy cannot be verified. That is, in the multi-flow sensor embodiments illustrated in FIGS. 2-4, the components illustrated in those figures can be opened/closed in ways that the plurality of flow sensors experience the same flow rate. Accordingly, by checking the values sensed by the flow sensors, personnel can check whether the flow sensors are in agreement. If there is not agreement, the flow sensors can be evaluated to determine which one is malfunctioning.

However, in the embodiment illustrated in FIG. 5, there is no backup or redundant flow sensor to provide a second detection level for comparison. Nevertheless, some degree of flow sensor operation can be verified to check whether the flow sensor 167 responds to flow. This may be done by opening the auxiliary valves in such a manner to induce a parallel flow, which enables the ability to detect and verify that the flow sensor moves off of registering zero when there is no flow. This same point of verification off of zero is also available in the embodiments illustrated in FIGS. 2-4 and may be used to supplement the redundancy measurement verification available for those embodiments.

Although the embodiments illustrated in FIGS. 2-4 may include single direction flow sensors or bi-directional flow sensors, the embodiment illustrated in FIG. 5 requires a flow sensor 167 that is bi-directional (i.e., it is configured to be able sense flow in either direction).

As shown in FIG. 5, the bi-directional flow sensor 167 is banked by optional limiting orifices 185, 187, 190. The component configuration also includes the auxiliary valves 150, 155, 160 as in the other disclosed embodiments. Because the flow sensor 167 is bi-directional, the component configuration is able to test on the upstream high pressure side when testing SSOV 145; likewise, the component configuration is able to test on the downstream low pressure side when testing SSOV 140.

To be more specific, when testing the SSOV 145, the auxiliary valves 150, 155 are opened while auxiliary valve 160 and SSOVs 140, 145 are closed. This results in the upstream side of the component configuration building to a high pressure state. If there were seat leakage in SSOV 145, that high pressure state would result in some amount of flow because the high pressure side would leak through SSOV 145 to some extent.

Likewise, to test SSOV 140, auxiliary valve 150 is opened while auxiliary valves 155, 160 and SSOVs 140, 145 are closed. As a result of this configuration, there should be no pressure in the chamber including the flow sensor 167 if the SSOV 140 has no seat leakage; however, if there is seat leakage at SSOV 140, there will be flow induced by the leaking from the high pressure side of SSOV 140.

It should be appreciated that the fluid controlled by the SSOVs is almost always dangerous to personnel or the environment; thus, the disclosed embodiments have particular utility because they provide the ability to detect seat leakage without the need to actually open the valves being checked.

As discussed above, the methodology for performing the seat leakage detection test methodology first involves closing the valves in the double block valve assembly in order to initiate a test. The valves remain closed for the duration of the test. Optionally, safety functions can be optionally integrated into the seat leakage detection test components, which could terminate the testing process if the double block valve is energized (opened).

At the beginning of the seat leakage testing process, the underlying process utilizing the double block safety valve must be shut down. However, at the end of the test all solenoid valves 150, 155, 160 may be closed and the double block valve can return to normal operation.

Once a failed test is registered, a soft or hard alarm may be issued to notify appropriate personnel. Further, it may be the responsibility of those personnel to determine if the SSOV can be used at the detected seat leakage levels.

Based on the ease of use of the equipment components described in the disclosed embodiments, a seat leakage check can be initiated by activating an on board test sequence at a prescribed interval. The logic required for testing can either be housed in a bolt-on leak detection device itself, or contained in the valve. Thus, the leak detection device could be provided as an optional add-on to a valve or be closely integrated with the valve.

In accordance with at least one embodiment, it is possible that all hardware/software required for the performing the seat leakage detection methodologies may be provided on or in the test valve or test valve assembly, with the only exception being a test initialization actuator and necessary mechanisms for registering test results; such components may be located either on the test valve, valve assembly or located in a remote location for ease of use. It should be understood that a seat leakage detection test methodology may be initiated at the valve, or at the main control panel with no time consuming hookups required.

Thus, in accordance with at least one embodiment, an onboard test module may be implemented utilizing an onboard microprocessor controlling other associated components in various different configurations, complexities and functions. Accordingly, a seat leakage detection test module may be coupled to the electromechanical valve that is operationally coupled to an associated BMS system. Therefore, such a test module may include a microprocessor and components that may be coupled to and in communication with an Input/Output (IO)/Indication sub-module. These components may include a plurality of indicator lights (e.g., Light Emitting Diodes) or an Liquid Crystal Display (LCD) associated with a test-in-progress, a failed test or a passed test. The operations performed for the testing methodology may be programmed into software running on the microprocessor or the like. In such an implementation, the microprocessor may be configured to control the test and report simple pass/fail results.

Thus, the test methodology can report test status via the same or similar indicator lights included in the IO/Indication sub-module as well as log (e.g., electronically store) test data resulting from the testing methodology. This data could be retrieved via a communication port included in the communication sub-module included on the test module and may be analyzed to determine and document valve maintenance needs, track performance, track deterioration and establish a record of safety compliance activity. Optionally, data may be displayed on a LCD (not shown).

The ability to issue an alert thereby providing a notification of need for or overdue test may be built into the microprocessor implemented test module to further enhance safety by ensuring that safety tests are not forgotten or skipped.

It should be appreciated that, although not shown, the disclosed seat leakage detection test methodology may be initiated by pressing an actuator, e.g., button on the valve, in an auxiliary control panel near the valve on the leak detection module or at the main system control (e.g., the BMS). The actuator (regardless of its location) may be connected or coupled to a specific test valve and initiate the test sequence when actuated.

Further, although the illustrated embodiments have been described in connection with gate valves which are electromechanical valves, it should be understood that there may be utility in utilizing the disclosed embodiments or adapting them for use with hydraulic or pneumatic valves. Moreover, it should be understood that the disclosed component configurations and methodologies could be used for seat leakage detection of any valve that might suffer from seat leakage.

Thus, regardless of the exact details provided with reference to certain illustrated embodiments, variations and modifications exist within the scope and spirit of the invention as described and defined in the following claims. Accordingly, while illustrated embodiments have been outlined above, it is evident that many alternatives, modifications and variations will be apparent to those skilled in the art. For example, although the illustrated embodiments are discussed in conjunction with control of valves in a combustion service environment (involving a BMS control system), it should be understood that the embodiments may be utilized with valves that control, gases, liquids and also solids, for example, pulverized coal. Accordingly, the various embodiments of the invention, as set forth above, are intended to be illustrative, not limiting. Various changes may be made without departing from the spirit and scope of the invention.

Thus, it should be understood that the disclosed embodiments are described in conjunction with a double block valve that includes two shut off valves to provide industry required redundancy. However, the seat leakage detection test components and methodologies may be utilized to test a block valve with more than two valves or another multi-valve assembly. As a result, the components illustrated in the figures would be replicated in sets corresponding to each additional, included valve.

As a result, it will be apparent for those skilled in the art that the illustrative embodiments described are only examples and that various modifications can be made within the scope of the invention as defined in the appended claims.

What is claimed is:

1. Equipment for performing seat leakage detection on a valve assembly including at least two valves to be tested, the equipment comprising:
    a plurality of manifold passages defining a plurality of fluid paths;
    at least one flow sensor configured to sense flow in a fluid path of the plurality of fluid paths containing the at least one flow sensor; and
    a plurality of auxiliary valves provided in relation to the at least one flow sensor and configured to be closed or opened to alter paths for potential flow through the plurality of fluid paths from an upstream side of the valve assembly to a downstream side of the valve assembly,
    wherein, while each of the at least two valve assembly valves remain closed, at least a first auxiliary valve of the plurality of auxiliary valves is closed to enable flow of fluid to test a first valve of the at least two valve assembly valves and, subsequently, at least another auxiliary valve of the plurality of auxiliary valves is closed to enable flow of fluid to test a second valve of the at least two valve assembly valves.

2. The equipment of claim 1, wherein the at least one flow sensor is included in a plurality of flow sensors including a first flow sensor and a second flow sensor.

3. The equipment of claim 2, wherein seat leakage detection testing of the second valve of the valve assembly is performed by opening first and second auxiliary valves of the plurality of auxiliary valves to enable flow of fluid through the passage way encompassing the first and second auxiliary valves and the at least one flow sensor to prime that passage way and subsequently sensing whether there is any seat leakage in the first valve of the valve assembly using the first flow sensor to detect flow of fluid.

4. The equipment of claim 3, wherein seat leakage detection testing of the first valve of the valve assembly is performed by opening second and third auxiliary valves while maintaining the first and second valves of the valve assembly closed and subsequently sensing whether there is any seat leakage in the second valve of the valve assembly using the second flow sensor to detect flow of fluid along a passage way encompassing the second and third auxiliary valves and the second flow sensor.

5. The equipment of claim 2, wherein the plurality of auxiliary valves are provided in relation to the plurality of flow sensors so that the flow sensors are isolated from normal operation of the at least two valves of the valve assembly when seat leakage detection testing is not in progress.

6. The equipment of claim 1, wherein the at least one flow sensor is a bi-directional flow sensor.

7. The equipment of claim 6, wherein the bi-directional flow sensor is configured to sense flow induced by leakage from the high pressure upstream side to the low pressure downstream side when testing each valve with a flow sensor located in a low pressure area when testing the first valve and located in a high pressure area when testing the second valve.

8. The equipment of claim 1, further comprising two manual isolation valves provided on opposite sides of a combination of the valve assembly and the equipment.

9. The equipment of claim 1, further comprising a plurality of limiting orifices, each corresponding to a plurality of flow sensors including the at least one flow sensor and being configured to reduce flow of fluid in the passage way encompassing the corresponding flow sensor prior to the location of that flow sensor.

10. The equipment of claim 1, further comprising a supply port configured to enable increase of a total pressure or flow of fluid within the plurality of manifold passages.

11. The equipment of claim 1, further comprising a vent to atmosphere provided in between the at least two valves of the valve assembly.

12. The equipment of claim 1, wherein the valve assembly is a double block valve assembly.

13. The equipment of claim 1, further comprising an onboard test module implemented utilizing a microprocessor running software configured to perform control operations of the equipment components to perform seat leakage detection testing of the valve assembly and output an indication of whether the assembly has passed or failed the seat leakage detection testing.

14. The equipment of claim 13, wherein the indication of leakage detection testing is recorded and analyzed for determining valve performance trends.

15. A method for performing seat leakage detection on a valve assembly including at least two valves to be tested, the method comprising:
    providing at least one flow sensor and a plurality of auxiliary valves provided in relation to the at least one flow sensor, the plurality of auxiliary valves being configured to be closed or opened to alter paths for potential flow from an upstream side of the valve assembly to a downstream side of the valve assembly,
    closing each valve of the valve assembly; and
    closing a first auxiliary valve of the plurality of auxiliary valves to enable flow of fluid through manifold passages of a plurality of manifold passages to test a first valve of the at least two valve assembly valves and, subsequently, opening the first auxiliary valve and closing at least one other auxiliary valve to test a second valve of the at least two valve assembly valves.

16. The method of claim 15, wherein the providing of the at least one flow sensor is included in providing a plurality of flow sensors including a first flow sensor and a second flow sensor.

17. The method of claim 15, wherein seat leakage detection testing of the second valve of the valve assembly is performed by opening first and second auxiliary valves of the plurality of auxiliary valves to enable flow of fluid through the passage way encompassing the first and second auxiliary valves and the at least one flow sensor to prime that passage way and subsequently sensing whether there is any seat leakage in the first valve of the valve assembly using the first flow sensor to detect flow of fluid.

18. The method of claim 17, wherein seat leakage detection testing of the first valve of the valve assembly is performed by opening second and third auxiliary valves while maintaining the first and second valves of the valve assembly closed and subsequently sensing whether there is any seat leakage in the second valve of the valve assembly using the second flow sensor to detect flow of fluid along a passage way encompassing the second and third auxiliary valves and the second flow sensor.

19. The method of claim 15, wherein the plurality of auxiliary valves are provided in relation to the at least one flow sensor so that the at least one flow sensor is isolated from normal operation of the at least two valves of the valve assembly when seat leakage detection testing is not in progress.

20. The method of claim 15, further comprising providing two manual isolation valves on opposite sides of a combination of the valve assembly.

21. The method of claim 15, further comprising providing a plurality of limiting orifices corresponding to a plurality of flow sensors including the at least one flow sensor and being configured to reduce flow of fluid in the passage way encompassing the corresponding flow sensor prior to the location of that flow sensor.

22. The method of claim 15, wherein the at least two valves in the valve assembly remain closed during the duration of the valve seat detection test.

23. The method of claim 15, further comprising detecting the pressure upstream of the first valve of the valve assembly, the pressure in a middle section between first and second valves of the valve assembly and the downstream pressure downstream of the second valve of the valve assembly prior to performing detection of flow using the at least one flow sensor.

24. The method of claim 23, wherein the indication of leakage detection testing is recorded and analyzed for determining valve performance trends.

\* \* \* \* \*